United States Patent
Kawashima et al.

(10) Patent No.: US 7,916,259 B2
(45) Date of Patent: Mar. 29, 2011

(54) DISPLAY DEVICE

(75) Inventors: Yuki Kawashima, Yokohama (JP); Hisashi Nagata, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 124 days.

(21) Appl. No.: 12/280,103

(22) PCT Filed: Nov. 20, 2006

(86) PCT No.: PCT/JP2006/323089
§ 371 (c)(1),
(2), (4) Date: Aug. 20, 2008

(87) PCT Pub. No.: WO2007/129420
PCT Pub. Date: Nov. 15, 2007

(65) Prior Publication Data
US 2009/0066896 A1    Mar. 12, 2009

(30) Foreign Application Priority Data
Apr. 24, 2006 (JP) ................. 2006-119838

(51) Int. Cl.
*G02F 1/1334* (2006.01)
(52) U.S. Cl. ....................... 349/141; 349/139
(58) Field of Classification Search ............. 349/139, 349/141
See application file for complete search history.

(56) References Cited

U.S. PATENT DOCUMENTS

| | | | |
|---|---|---|---|
| 6,281,952 B1 * | 8/2001 | Okamoto et al. | 349/12 |
| 6,914,656 B2 * | 7/2005 | Sakamoto et al. | 349/141 |
| 7,477,347 B2 * | 1/2009 | Matsushima et al. | 349/114 |
| 2001/0052948 A1 | 12/2001 | Okamoto et al. | |
| 2003/0067570 A1 | 4/2003 | Okamoto et al. | |
| 2003/0218664 A1 * | 11/2003 | Sakamoto et al. | 347/114 |
| 2004/0027524 A1 * | 2/2004 | Shiota et al. | 349/129 |
| 2004/0160537 A1 | 8/2004 | Okamoto et al. | |
| 2004/0201800 A1 * | 10/2004 | Jin et al. | 349/113 |
| 2005/0128389 A1 * | 6/2005 | Yang | 349/114 |
| 2005/0275785 A1 * | 12/2005 | Maeda et al. | 349/143 |
| 2006/0119752 A1 | 6/2006 | Okamoto et al. | |
| 2006/0215086 A1 * | 9/2006 | Kurasawa | 349/114 |

FOREIGN PATENT DOCUMENTS

| | | |
|---|---|---|
| CN | 1544978 A | 11/2004 |
| JP | 2005-173564 | 6/2005 |

OTHER PUBLICATIONS

International Search Report for PCT/JP2006/323089 mailed Feb. 6, 2007.

* cited by examiner

*Primary Examiner* — K. Cyrus Kianni
(74) *Attorney, Agent, or Firm* — Nixon & Vanderhye P.C.

(57) ABSTRACT

A display device according to the present invention contains a transparent display unit (18) and a reflective display unit (19) in one pixel. The reflective display unit (19) is provided with an insulating layer (8) constituting a multi-gap layer, and a pixel electrode (16) and a common electrode (17) set closer to a display surface than a reflective film (7) at least through the insulating layer. The reflective film (7) is provided on the same plane as the insulating layer (8) in the lower substrate (10) and covered with the insulating layer (8), or provided in a lower layer than the insulating layer (8) in the lower substrate (10) and overlapped with the insulating layer (8).

2 Claims, 7 Drawing Sheets

DISPLAY DEVICE

This application is the U.S. national phase of International Application No. PCT/JP2006/323089, filed 20 Nov. 2006 which designated the U.S. and claims priority to Japanese Application No. 2006-119838, filed 24 Apr. 2006, the entire contents of each of which are hereby incorporated by reference.

TECHNICAL FIELD

The present invention relates to a semi-transparent display device (a transflective display device) in which both a transparent display unit that carries out a display by transmitting light from a light source and a reflective display unit that carries out a display by reflecting externally entered light are provided in a single pixel.

BACKGROUND ART

A reflective display device can carry out a display by reflecting externally entered light. This allows an improvement in low power consumption, a reduction in thickness, and a reduction in weight. On the other hand, a transparent display device can be used in an environment of weak surrounding light.

Given this factor, as a display device having both advantages of a reflective display device and a transparent display device, a semi-transparent display device, in which both a transparent display unit and a reflective display unit are provided in a single pixel, has been developed recently. Such a semi-transparent display device realizes a fine display with low power consumption by carrying out a reflection display with the use of externally entered light in a bright surrounding environment, whereas realizes a fine display by carrying out a transmission display with the use a backlight in a dark surrounding environment.

In addition, there has been a transparent display device adopting an IPS (In Plane Switching) system as a technique for realizing a wide viewing angle. A transparent display device adopting a vertical electric field driving method is inferior in viewing angle property to one adopting a horizontal electric field driving method.

In view of the circumstances, it has been suggested to utilize a semi-transparent display device adopting the IPS method in order for the semi-transparent display device to further improve the viewing angle property.

For example, (1) a semi-transparent liquid crystal display device using a comb-teeth electrode as a reflective electrode (see Patent Document 1, for example), and (2) a semi-transparent liquid crystal display device in which a comb-teeth electrode and a reflective member are separately provided (see Patent Document 2, for example) are known as the semi-transparent display device adopting the IPS method as the horizontal electric field driving method.

Figure 6:
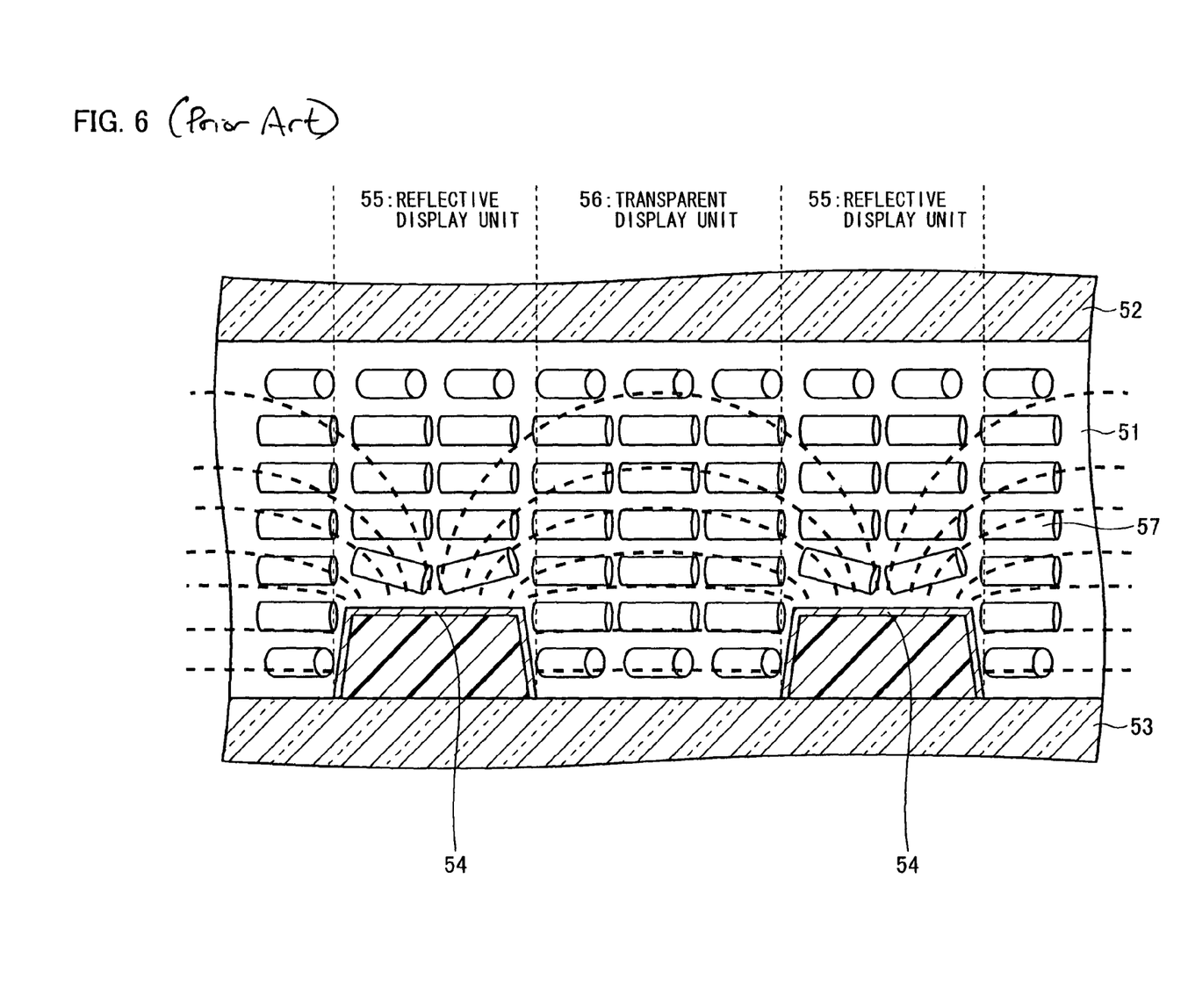
FIG. 6 is a cross-sectional view showing a schematic structure of a main part in a semitransparent liquid crystal display device utilizing an IPS system and being described in Patent Citation 1.
Figure 7:
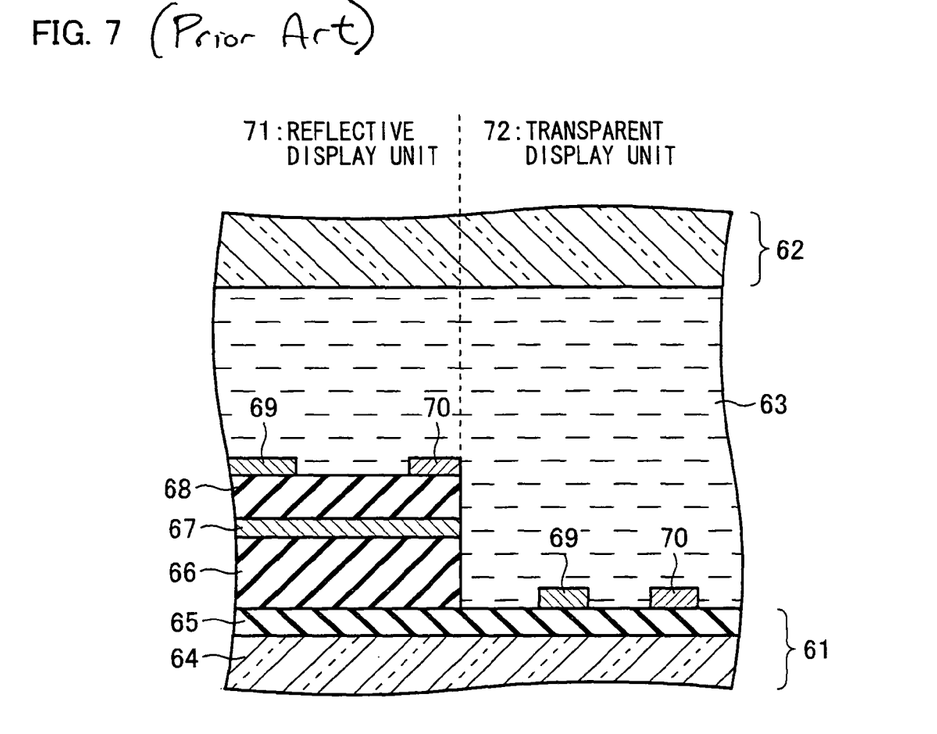
FIG. 7 is a cross-sectional view showing a schematic structure of a main part in a semitransparent liquid crystal display device utilizing an IPS system and being described in Patent Citation 2.

As an example of the semi-transparent display device, FIG. 6 and FIG. 7 are cross-sectional views showing schematic structures of main parts of semi-transparent liquid crystal display devices, adopting the IPS method, disclosed in Patent Documents 1 and 2, respectively.

As shown in FIG. 6, the semitransparent liquid crystal display device, adopting the IPS method, disclosed in Patent Document 1 utilizes, as a reflective electrode in a reflective display unit 55 (a reflective region), a comb-teeth electrode 54 provided on a backside substrate (hereinafter referred to as "lower substrate") 53 that is provided on the opposite side of a display-side substrate (hereinafter referred to as "upper substrate") 52, a liquid crystal layer 51 being sandwiched by the upper and lower substrates 52 and 53. A Gap section between neighboring comb-teeth electrodes 54 is used as a transparent display unit 56 (a transparent region). The comb-teeth electrode 54 is a reflective pixel electrode via which the liquid crystal layer 51 sandwiched by the lower substrate 53 and the upper substrate 52 is driven. In the transparent display unit 56, liquid crystal molecules 57 change their alignment state in accordance with an electric field caused by the comb-teeth electrode 54.

As shown in FIG. 7, the semitransparent liquid crystal display device, adopting the IPS system, disclosed in Patent Citation 2 includes a pixel electrode 69 and a common electrode 70, serving as a comb-teeth electrode, via which a horizontal electric field driving is carried out, in a reflective display unit 71 (a reflective region) and in a transparent display unit 72 (a transparent region), respectively. An electrical field generated between the pixel electrode 69 and the common electrode 70 drives a liquid crystal layer 63 sandwiched by a lower substrate 61 (a backside substrate) and an upper substrate 62 (a display-side substrate).

With the semi-transparent liquid crystal display device, in the lower substrate 61 of the transparent display unit 72, the pixel electrode 69 and the common electrode 70 are arranged so as to be parallel to each other on a transparent insulating substrate 64, via a first insulating film 65. Meanwhile, in the reflective display unit 71, a second insulating film 66, a reflective plate 67 (a reflective member), and a third insulating film 68 are stacked on the first insulating film 65 in this order. The pixel electrode 69 and the common electrode 70 are provided on so as to be parallel to each other. The second insulating film 66 and the third insulating film 68, by which the reflective plate 67 is sandwiched, are provided for adjusting thicknesses of the liquid crystal layer 63 in the reflective display unit 71 and in the transparent display unit 72, based on a difference in optical path lengths between the display units 71 and 72.

[Patent Document 1]
Japanese Unexamined Patent Publication No. 11-242226 (publication date: Sep. 7, 1999) (U.S. Pat. No. 6,281,952 (issue date: Aug. 28, 2001))
[Patent Document 2]
Japanese Unexamined Publication No. 2003-344837 (publication date: Dec. 3, 2003) (U.S. Pat. No. 6,914,656 (issue date: Jul. 5, 2005))

DISCLOSURE OF INVENTION

However, as described in Patent Document 1, the problem occurs that the reflective region used as the reflective display unit 55 is limited by the shape of the comb-teeth electrode 54, when the comb-teeth electrode 54 is used as the reflective electrode.

Meanwhile, as described in Patent Citation 2, a conventional semi-transparent liquid crystal display device in which the comb-teeth electrode (the pixel electrode 69 and the common electrode 70) and the reflective plate 67 are provided on a single substrate so that the reflective plate 67 is provided below the comb-teeth electrode has a problem that the metallic reflective plate 67 adversely affects electric flux lines (a voltage to be applied to a liquid crystal) generated between the comb-teeth electrodes that are provided above the reflective plate 67. Therefore, such a conventional display device has a problem of lower quality of display.

The present invention is accomplished in view of the problems above, and an object of the present invention is to provide a semi-transparent display device capable of a simple designing of a reflective display unit and preventing a reflective member from adversely affecting a comb-teeth electrode.

A display device in accordance with the present invention is a display device including a pair of substrates, made up of a display-side substrate and a backside substrate, facing each other, that is on an opposite side of the display-side substrate, and a medium layer made up of a display medium which is sandwiched by the display-side substrate and the backside substrate, the display medium being driven and displayed by an electric field applied between comb-teeth electrodes provided on at least one of the pair of substrates, a pixel includes (i) a transparent display section that carries out a transparent display in response to an electric field applied between the comb-teeth electrodes and (ii) a transparent display section, having a reflective member provided separately from the comb-teeth electrodes, that carries out a reflective display in response to an electric field applied between ones of the comb-teeth electrodes, said ones of the comb-teeth electrodes and the reflective member overlapping each other, the reflective display section including a multi-gap layer, having an insulative property, which is provided on the backside substrate and which projects toward the medium layer so that the medium layer has a thinner thickness in the reflective display section than in the transparent display section, and the comb-teeth electrode being provided, via at least the multi-gap layer, so as to be closer to a display surface than the reflective layer, and the reflective member being provided in a lower layer than the multi-gap layer of the backside substrate so that the reflective member and the multi-gap layer overlap each other, or the reflective member being provided on a same plane as the multi-gap layer so as to be covered with the multi-gap layer.

Since the comb-teeth electrodes and the reflective member are separately provided, the reflective region is not limited by the disposition (layout) of the comb-teeth electrode as a case of a comb-teeth electrode used as a reflective electrode. Therefore, the degree of freedom for layout of a reflective region is quite high, and the reflective display unit can be designed easily.

In addition, the comb-teeth electrodes are provided, via at least the multi-gap layer, so as to be closer to a display surface than the reflective member. The reflective member is provided in a lower layer than the multi-gap layer of the backside substrate so that the reflective member and the multi-gap layer overlap each other, or provided on a same plane as the multi-gap layer so as to be covered with the multi-gap layer. Consequently, a gap between the comb-teeth electrodes and the reflective member becomes larger than a conventional device. Therefore, field shielding effect by the reflective member is less likely to occur than a conventional semi-transparent display device in which the reflective member is provided under the pixel electrode. As a result, it is possible that the display device of the present invention reduces more the effect that the metallic reflective member has on electric flux lines (a voltage to be applied to a liquid crystal) between the comb-teeth electrodes, as compared with a conventional device.

Therefore, with the arrangement, it is possible to provide a semi-transparent display device capable of simple designing of the reflective display unit and preventing the reflective member from adversely affecting the comb-teeth electrode.

DESCRIPTION OF REFERENCE NUMERALS

1: TRANSPARENT SUBSTRATE
2: GATE ELECTRODE
3: GATE INSULATING FILM
7: REFLECTIVE FILM (REFLECTIVE MEMBER)
8: INSULATING LAYER
9: ALIGNMENT FILM
10: LOWER SUBSTRATE
11: PIXEL
12: TFT
13: DATA SIGNAL LINE
14: SCANNING SIGNAL LINE
15: COMMON WIRING
16: PIXEL ELECTRODE (COMB-TEETH ELECTRODE)
17: COMMON ELECTRODE (COMB-TEETH ELECTRODE)
18: TRANSPARENT DISPLAY UNIT
19: REFLECTIVE DISPLAY UNIT
20: UPPER SUBSTRATE
24: ALIGNMENT FILM
30: LIQUID CRYSTAL LAYER (MEDIUM LAYER)
40: UPPER SUBSTRATE
41: INSULATING FILM

BEST MODE FOR CARRYING OUT THE INVENTION

Embodiment 1

One embodiment of the present invention is described below with reference to FIGS. 1 through 3.

Figure 1:
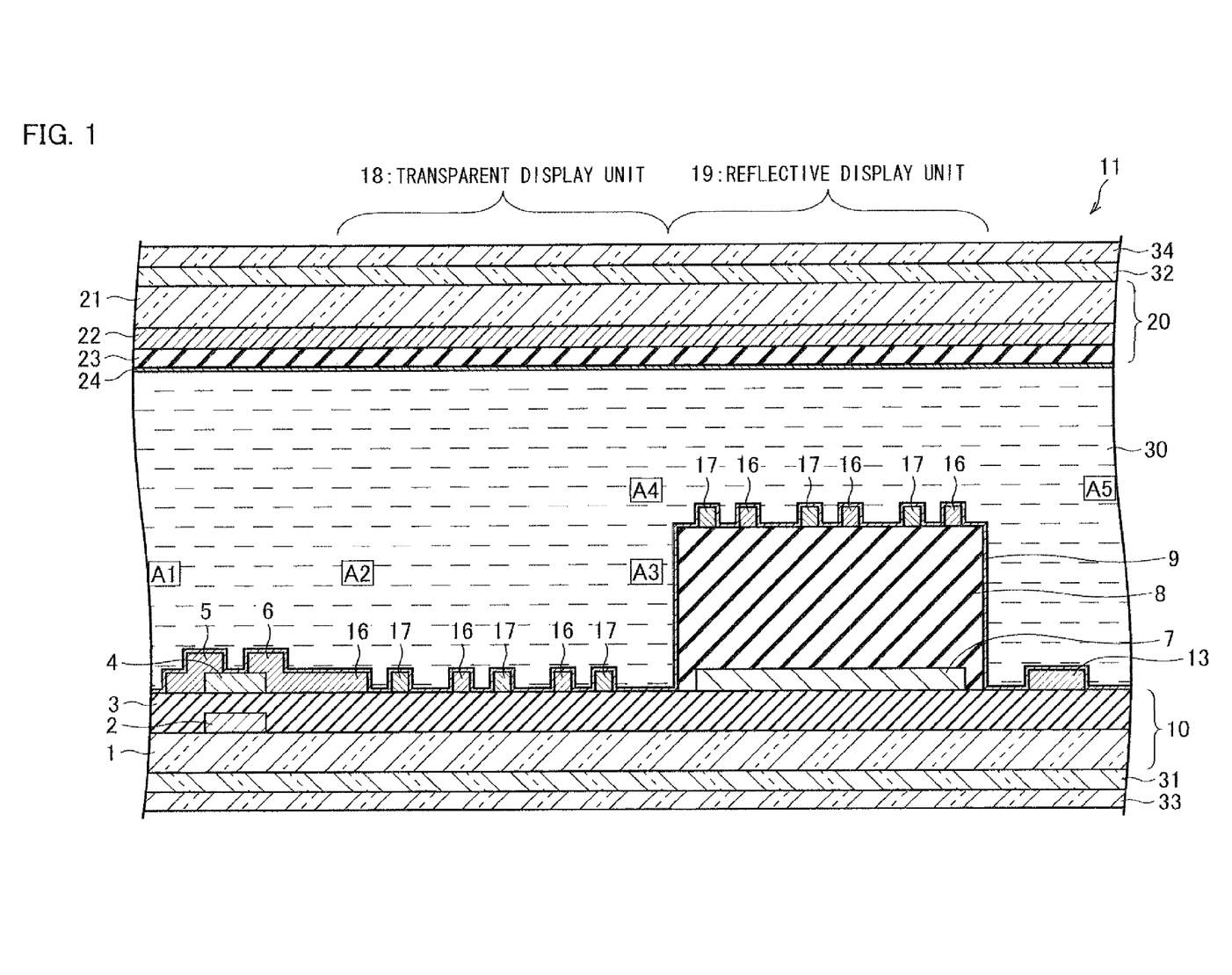
FIG. 1 is a cross-sectional view showing a structure of a pixel in a semi-transparent display device in accordance with Embodiment 1.

FIG. 1 is a cross-sectional view showing how a pixel is arranged in a semi-transparent display device in accordance with the present embodiment. FIG. 2 is a plane view showing how a pixel is arranged in an active matrix substrate in the semi-transparent display device shown in FIG. 1. The arrangement of the active matrix substrate in the semi-transparent display device shown in FIG. 1 schematically shows structures of each cross-section obtained by cutting the active matrix substrate shown in FIG. 2 along the line A1-A2-A3-A4-A5. In addition, a substrate on the side of a display surface is hereinafter referred to as an upper substrate, and a substrate on a backside, which faces the upper substrate, is hereinafter referred to as a lower substrate. Also, a semi-transparent liquid crystal display device is exemplified as the semi-transparent display device in accordance with the present embodiment.

As shown in FIG. 1, a semi-transparent liquid crystal display device (hereinafter referred to merely as "liquid crystal display device") in accordance with the present embodiment includes (i) a lower substrate 10 and an upper substrate 20 that face each other, and (ii) a liquid crystal layer 30 (a medium layer) sandwiched by the pair of substrates 10 and 20. Retardation films 31 and 32 and polarizing plates 33 and 34 are provided outside the pair of substrates 10 and 20 (opposite side of the surfaces which face each other), respectively.

The upper substrate 20 out of the pair of substrates is a so-called color filter substrate (a CF substrate) in which a color filter layer 22, an overcoat layer 23 (a planarizing layer), and an alignment film 24 are stacked on a surface of a transparent substrate 21 (a transparent insulating substrate) made of material such as glass, in this order from the side of the transparent substrate 21.

Figure 2:
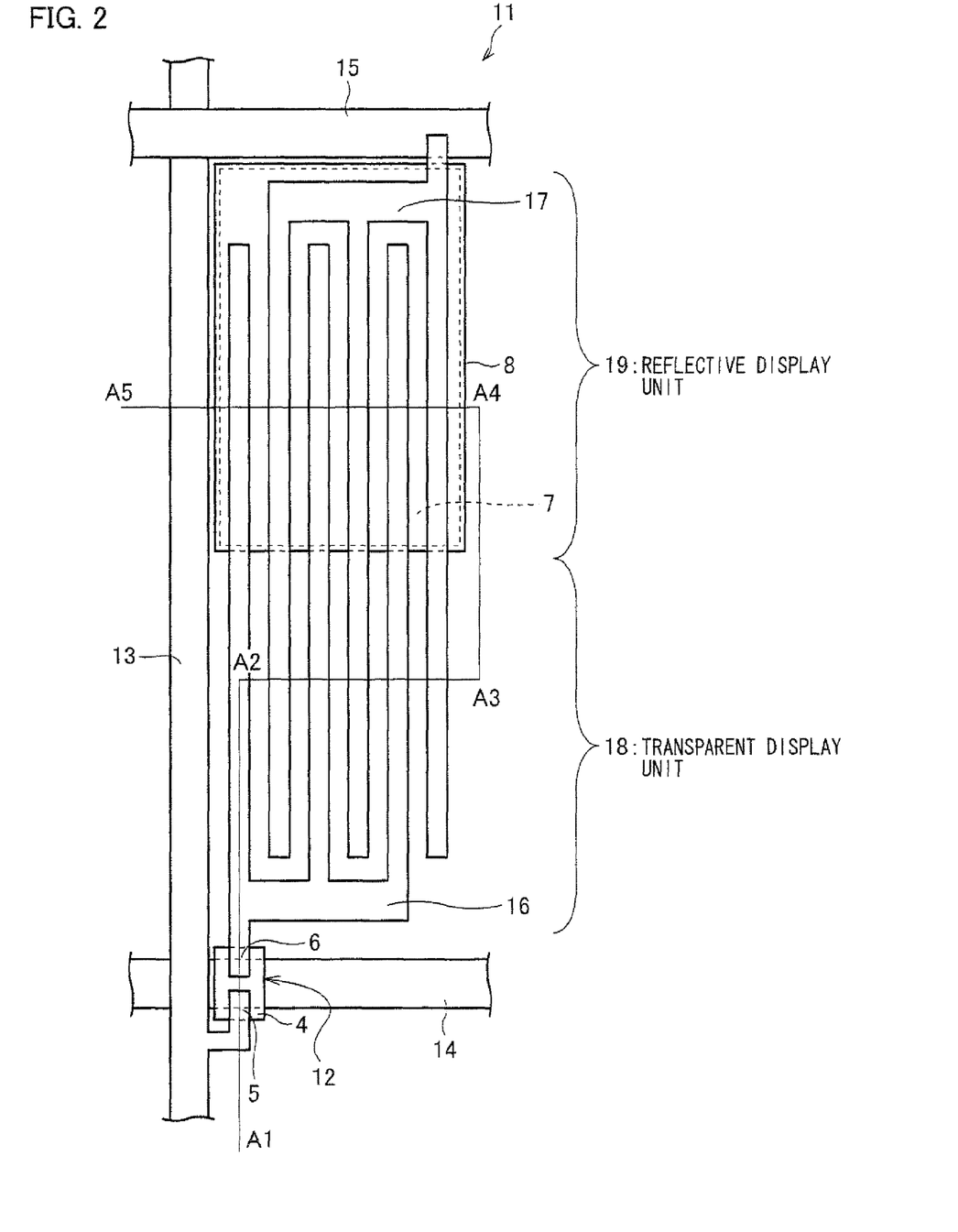
FIG. 2 is a plane view showing a structure of a pixel in an active matrix substrate in the semi-transparent display device shown in FIG. 1.

Meanwhile, as shown in FIG. 2, the lower substrate 10 is a so-called active matrix substrate in which a TFT (thin-film transistor) 12 serving as a switching element, a data signal line 13, a scanning signal line 14, and a common wiring 15 are provided on a transparent substrate 1 (a transparent insulating substrate) made of material such as glass shown in FIG. 1, thereby forming a matrix array of pixels 11.

A TFT 12 is, as shown in FIG. 2, provided at an intersection of a data signal line 13 and a scanning signal line 14 which are provided in respective line and row of the pixels 11 arrayed in a matrix manner. On the TFT 12, a protection film (not shown) is provided.

The TFT 12 is arranged so that a gate electrode 2, a gate insulating film 3, a semiconductor layer 4, a source electrode 5, and a drain electrode 6 are provided in this order on the transparent substrate 1 (see FIG. 1).

The gate electrode 2 of the TFT 12 is connected to the scanning signal line 14, and the source electrode 5 is connected to the data signal line 13. There is no particular difference between the arrangement and a conventional one, and therefore the specific explanation is omitted here.

Further, each of the pixels 11 includes a pixel electrode 16 and a common electrode 17, each of which has a comb-teeth shape and is made of a comb-teeth electrode. The pixel electrode 16 and the common electrode 17 are arranged to face and be parallel to each other so that their comb-teeth are alternately provided. A transparent electrode made of ITO (indium tin oxide) or the like is used as these comb-teeth electrodes (the pixel electrode 16 and the common electrode 17), for example. The pixel electrode 16 is connected to the drain electrode 6 of the TFT 12.

On the other hand, the common electrode 17 is connected to the common wiring 15 via a through-hole (not shown). The common wiring 15 is arranged to be parallel to the scanning line 14.

Moreover, as shown in FIGS. 1 and 2, a reflective film 7 (a reflective member) is partly provided in each of the pixels 11. This causes each of the pixels 11 to include (i) a transparent display unit 18 (a transparent region) that carries out a display (transparent display) by transmitting light from a backlight (a light source) and (ii) a reflective display unit 19 (a reflective region), including the reflective film 7, carries out a display (reflective display) by causing the reflective film 7 to reflect externally entered light.

The reflective display unit 19 includes, as shown in FIG. 1, a multi-gap layer made up of an insulating layer 8 for retardation control.

The multi-gap layer is provided for adjusting a thickness of the liquid crystal layer 30 (a gap between the substrates) in the transparent display unit 18 and in the reflective display unit 19, based on a difference in optical path length between the display units. The multi-gap layer is provided on the lower substrate 10 and projected toward the liquid crystal layer 30 so that the liquid crystal layer 30 has a thinner thickness in the reflective display unit 19 than in the transparent display unit 18. The thickness of the insulating layer 8 of which the multi-gap layer is made is preferably set so that the display units have a single optical path length of light passing through the liquid crystal layer 30.

In the transparent display unit 19, the pixel electrode 16 and the common electrode 17 are provided on the multi-gap layer, whereas the reflective film 7 is provided under the multi-gap layer.

The reflective film 7 is covered completely by the insulating layer 8 of which the multi-gap layer is made. As described above, in the transparent display unit 19, the reflective film 7 and the comb-teeth electrodes (the pixel electrode 16 and the common electrode 17) are provided in different layers, via the insulating layer 8 of which the multi-gap layer is made. The multi-gap layer causes the reflective layer 7 to be sufficiently away from the pixel electrode 16 and the common electrode 17.

The following description specifically deals with how the transparent display unit 18 and the reflective display unit 19 are arranged in the liquid display device of the present embodiment.

As shown in FIG. 1, in the transparent display unit 18, the pixel electrode 16 and the common electrode 17 are provided on the transparent substrate 1 so as to be parallel to each other, via the gate insulating film 3.

Meanwhile, in the reflective display unit 19, the reflective film 7 is provided on the gate insulating film 3. Also, the insulating layer 8 of which the multi-gap layer is made is provided on the gate insulating film 3 so as to cover the reflecting film 7. The pixel electrode 16 and the common electrode 17 in the reflective display unit 19 are provided on this multi-gap layer so as to be parallel to each other.

The pixel electrode 16 and the common electrode 17 may be provided so as to extend along a side surface (the side surface may have a taper shape) of the insulating layer 8, of which the multi-gap layer is made, up to the top face of the insulating layer 8. The pixel electrode 16 and the common electrode 17 may also be connected electrically to electric wires provided below the insulating layer 8, via a through-hole (not shown) provided at an end of the insulating layer 8.

In the transparent display unit 18 and the reflective display unit 19, the liquid crystal layer 30 is driven and displayed (horizontal electric field drive) by an electric field generated between the pixel electrode 16 and the common electrode 17. An alignment film 9 is provided on the pixel electrode 16 and the common electrode 17 so as to be in contact with the liquid crystal layer 30. In addition, a basecoat film may be provided on the transparent substrate 1.

According to the present embodiment, the comb-teeth electrodes (the pixel electrode 16 and the common electrode 17) and the reflective film 7 (the reflective member) are provided separately. This causes the liquid crystal display device of the present embodiment has a high degree of freedom for layout of the reflective region because the reflective region is not limited by the layout of the comb-teeth electrode, unlike a case where a comb-teeth electrode is used as a reflective electrode. Therefore, the reflective display unit 19 can be designed easily.

In the reflective display unit 19 in accordance with the present embodiment, the boundary surface of the two display units is arranged to be parallel to a short side of the pixel 11, for example, as shown in FIG. 2. This causes a reduction in step occurred, at the boundary of the two display units 18 and 19, by the multi-gap layer due to a difference in optimal thickness of the liquid crystal layer between the display units.

Further, the pixel electrode 16 and the common electrode 17 are provided so as to extend in a direction parallel to a long side of the pixel 11. In the present embodiment, the boundary of the display units is, for example, provided in a direction perpendicular to the direction in which the pixel electrode 16 and the common electrode 17 extend (that is, parallel to a direction of an electric field caused by the pixel electrode 16 and the common electrode 17).

Note that, in a case where comb-teeth electrodes and reflective member are thus provided separately but in a case, like a semi-transparent liquid crystal display device disclosed in Patent Citation 2 (see FIG. 7), where a third insulating film 68, provided between a reflective plate 67 and comb-teeth electrodes (a pixel electrode 69 and a common electrode 70), has a thin thickness, the comb-teeth electrodes on the reflective plate 67 are greatly affected by field shielding effect caused by the reflective plate 67 as.

According to the present embodiment, since the reflective film 7 is provided under the multi-gap layer, the field shielding effect is less likely to occur than a conventional semi-transparent liquid crystal display device in which a reflective member is provided under a pixel electrode.

As such, it is possible that the liquid crystal display device of the present embodiment reduces more the effect that the metallic reflective member has on electric flux lines (a voltage applied to a liquid crystal) between the comb-teeth electrodes, as compared with a conventional device. Note that the parallax caused by the provision of the reflective film 7 under the multi-gap layer does not affect human eyes at all. Therefore, it is possible that the present embodiment provides a semi-transparent liquid crystal display device that has a high degree of freedom for layout of the reflective region and has a higher quality of display than a conventional semi-transparent liquid crystal display device in which a reflective member is provided under a pixel electrode.

The liquid crystal display device of the present embodiment is not limited to a specific one, provided that the reflective film 7 is provided under the multi-gap layer. This allows the liquid crystal display device to be manufactured with the use of conventionally known production facilities, methods, and materials.

The present embodiment deals with a case where the pixel electrode 16 and the common electrode 17 are provided so as to extend in a direction parallel to the long side of the pixel 11. The present embodiment, however, is not limited to this. Instead, the pixel electrode 16 and the common electrode 17 may be provided so as to extend in a direction parallel to the short side of the pixel 11.

Note that the pixel electrode 16 and the common electrode 17 are not necessarily provided so as to extend in only one direction. For example, the comb-teeth electrodes (the pixel electrode 16 and the common electrode 17) may be provided so as to extend in different directions in the transparent display unit 18 and in the reflective display unit 19.

Figure 3:
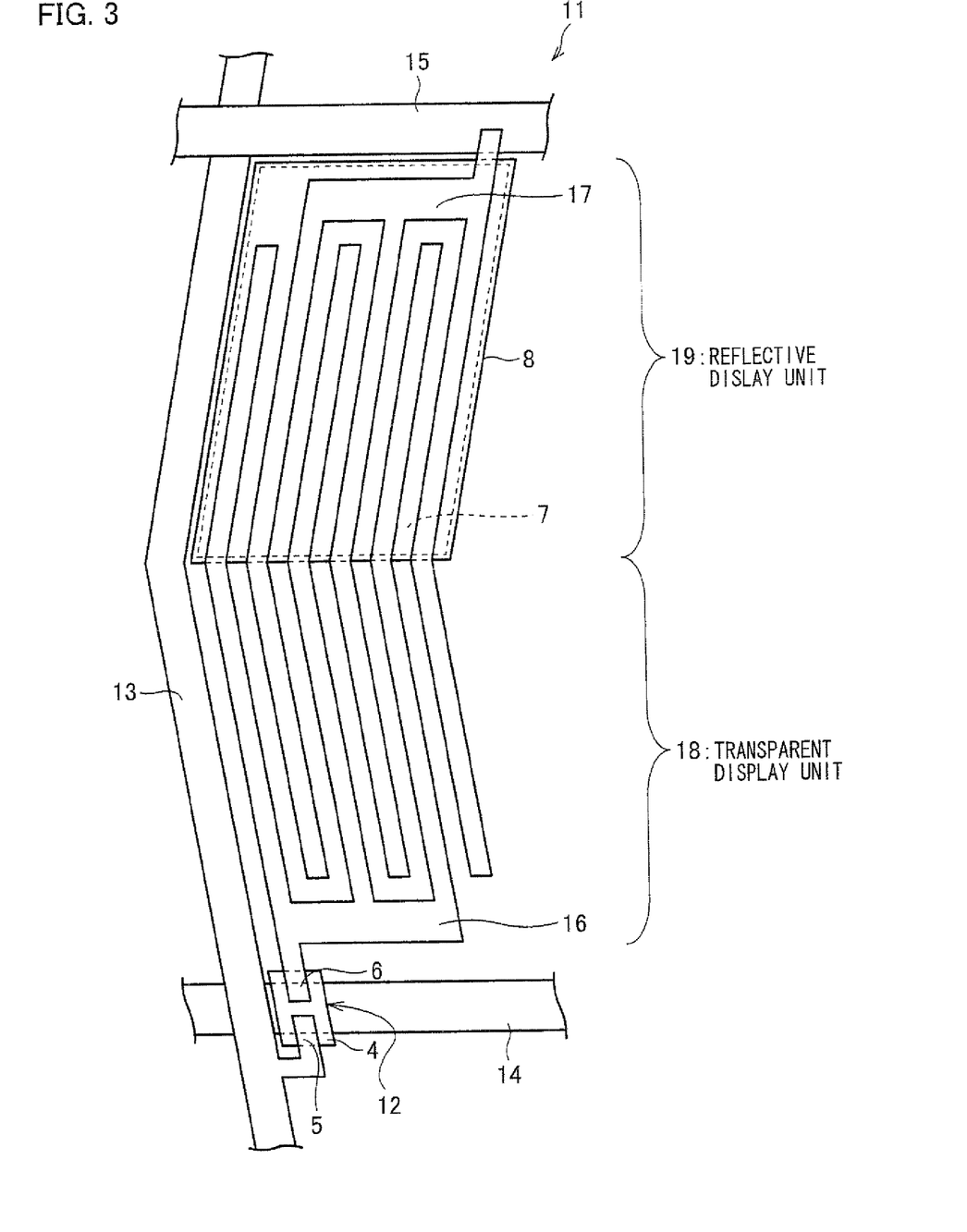
FIG. 3 is a plane view showing a structure of a pixel in an active matrix substrate having a pixel structure different to that of the active matrix substrate shown in FIG. 2.

As an example of a pixel arrangement in the lower substrate 10 in accordance with the present embodiment, FIG. 3 shows an arrangement of a pixel of an active matrix substrate having a pixel arrangement different to that of the active matrix substrate (the lower substrate 10) shown in FIG. 2.

In a lower substrate 10 shown in FIG. 3, a data signal line 13 is bended in the shape of "<", and intersects, at respective different angles, with (i) a scanning signal line 14 on the side of a transparent display unit 18 and (ii) a common wiring 15 on the side of a reflective display unit 19. The pixel electrode 16 and the common electrode 17 are provided so as to extend along the data signal line 13 which bends in the shape of "<". On account of this, the pixel electrode 16 and the common electrode 17 in the lower substrate 10 shown in FIG. 3 are bended at the boundary of the transparent display unit 18 and the reflective display unit 19.

At upper and lower ends of the pixel 11, the data signal line 13, the pixel electrode 16, and the common electrode 17 are inclined at a same angle in directions reverse to each other. Therefore, the data signal line 13, the pixel electrode 16, and the common electrode 17 are bended respectively at the center of the pixel 11. In each of the pixels, the lower substrate 10 shown in FIG. 3 is divided into and used as the transparent display unit 18 and the reflective display unit 19, and so the boundary of the display units 18 and 19 becomes the bended portion at the center of the pixel 11. This causes an area ratio between the transparent display unit 18 and the reflective display unit 19 to become 1:1.

Note that when the pixel electrode 16 and the common electrode 17 are arranged so as to incline at different angles at the upper and lower ends of the pixel 11, the pixel electrode 16 and the common electrode 17 are bended at a position shifted from the center of the pixel 11. When the boundary of the display units 18 and 19 is set to the bended portion which is shifted from the center of the pixel, it is possible to set the area ratio between the transparent display unit 18 and the reflective display unit 19 to an arbitrary one which is other than 1:1.

In the present embodiment, as described above, the direction in which the pixel electrode 16 and the common electrode 17 in the pixel 11 are provided so as to extend is not limited to a specific one, and the area ratio between the transparent display unit 18 and the reflective display unit 19 in the pixel 11 is not limited to a specific one. Moreover, the layout of the reflective display unit 19 (the reflective region) is not particularly limited, and may be changed as appropriate according to desired physical properties and purposes.

Further, the reflective film 7 in the reflective display unit 19 of the present embodiment may have concavity and convexity on its surface so as to have a light scattering property. This allows a prevention of the display surface from being a mirror surface. The liquid crystal display device may further include a light scattering film in a region outside the transparent substrate 21, which region faces the pixel electrode 16 and the common electrode 17. Alternatively, the polarizing plate 34 may have a light scattering property.

The concavity and convexity on the reflective film 7 can be easily realized by providing concavity and convexity on the surface of a gate insulating film 3, or by providing an organic insulating film (not shown) having concavity and convexity on its surface on the gate insulating film 3 and then carrying out sputtering of a metallic material such as aluminum used as the reflective film 7 with respect to the concavity and convexity thus provided. Alternatively, the concavity and convexity on the reflective film 7 can be easily realized by etching the transparent substrate 1 so that concavity and convexity are provided on the transparent substrate 1 and then providing a reflective film 7 on the concavity and convexity thus provided, via an insulating film such as a gate insulating film 3.

The reflective film 7 may be electrically isolated from or electrically connected to other wiring.

The display medium sandwiched by the lower substrate 10 and the upper substrate 20 is not limited to a liquid crystal, provided that the display medium is driven and displayed in response to an applied electric field. It is possible to use, as a display medium, a medium that is optically modulated in response to an applied electric field. That is, it is possible to use, as a medium layer made of the display medium, an optical modulation layer made of a medium having an optical property. The optical modulation includes a change in alignment direction, a change in refractive index, a change in optical anisotropy, and the like.

Specifically, the display medium may be liquid crystal, dielectric liquid, electroluminescence, or electrochromics, for example. A display device in accordance with the present embodiment is suitably used in a liquid crystal display device which can carry out a display with low power consumption.

The present embodiment deals with a case where comb-teeth electrodes (pixel electrode 16 and common electrode 17) are provided only on a lower substrate 10. However, the present embodiment is not limited to this. Comb-teeth electrodes may also be provided on an upper substrate 20.

Embodiment 2

Another embodiment is described below with reference to FIG. 4 mainly. It should be noted that differences between Embodiments 1 and 2 are described in the present embodiment, and that components having the same features as in Embodiment 1 are given the same reference numerals and their explanation is omitted.

Figure 4:
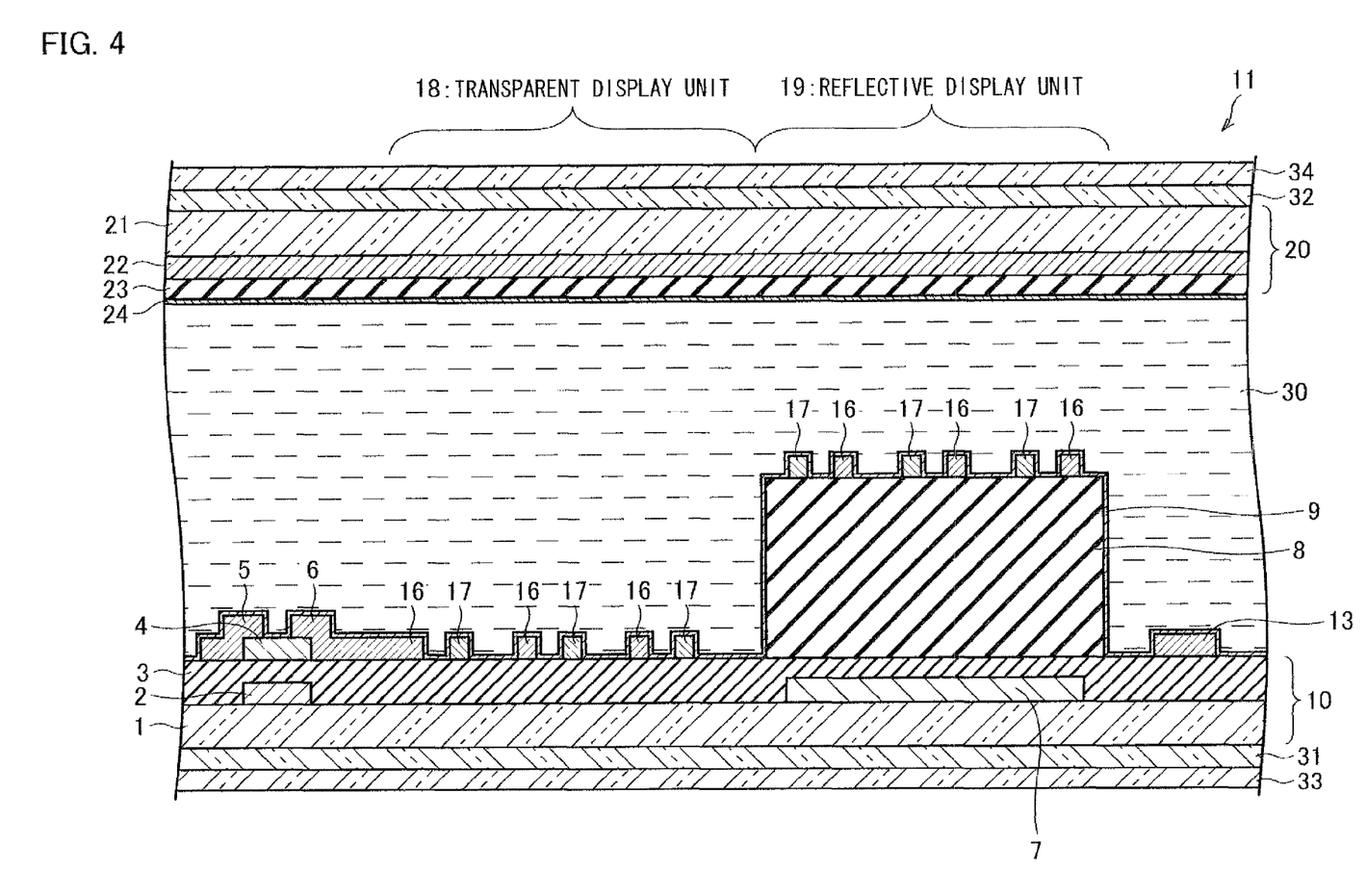
FIG. 4 is a cross-sectional view showing a structure of a pixel in a semi-transparent display device in accordance with Embodiment 2.

FIG. 4 is a cross-sectional view showing how a pixel is arranged in a semi-transparent display device in accordance with the present embodiment. Embodiment 2 deals with a semi-transparent liquid crystal display device as an example of a semi-transparent display device in accordance with the present embodiment. The arrangement of an active matrix substrate (a lower substrate) in the semi-transparent display device shown in FIG. 4 schematically shows arrangements of respective cross-sections obtained by cutting the active matrix substrate shown in FIG. 2 along the line A1-A2-A3-A4-A5.

As shown in FIG. 1, Embodiment 1 deals with an example in which (i) a reflective film 7 is provided on the same plane as a plane where a multi-gap layer is provided in a lower substrate 10 and (ii) the reflective film 7 is covered with the multi-gap layer, and is provided on the same plane as a plane where comb-teeth electrodes (a pixel electrode 16 and a common electrode 17) that are provided on the lower substrate 10 in a transparent display unit 18.

In contrast, as shown in FIG. 4, the present embodiment deals with a case where a reflective film 7 is provided in a lower layer than a multi-gap layer so that the reflective film 7 and the multi-gap layer overlap each other, and so as to be provided in a lower layer than comb-teeth electrodes (a pixel electrode 16 and a common electrode 17) that are provided on the lower substrate 10 in the transparent display unit 18.

In the transparent display unit 18 of the present embodiment, the pixel electrode 16 and the common electrode 17 are provided on a transparent substrate 1 via a gate insulating film 3 so as to be parallel to each other and provided. This is similar to Embodiment 1.

On the other hand, in the reflective display unit 19, the reflective film 7 is provided on the transparent substrate 1. The reflective film 7 is completely covered with the gate insulating film 3 which is stacked on the transparent film 1. An insulating layer 8 serving as the multi-gap layer is provided on the gate insulating film 3 (i) so that the insulating layer 8 and the reflective film 7 overlap each other and (ii) so as to cover the reflective film 7. The pixel electrode 16 and the common electrode 17 in the reflective display unit 19 are provided on the multi-gap layer so as to be parallel to each other, as is the case with Embodiment 1. In the present embodiment, an alignment film 9 is also provided on the pixel electrode 16 and the common electrode 17 so as to be in contact with a liquid crystal layer 30. A basecoat film or the like may be provided on the transparent substrate 1.

As described above, according to the present embodiment, the reflective film 7 is provided in a lower layer than the multi-gap layer in the lower substrate 10, that is, in a lower layer than the comb-teeth electrodes (the pixel electrode 16 and the common electrode 17) on the same substrate (the lower substrate 10) as the comb-teeth electrodes (the pixel electrode 16 and the common electrode 17) in the transparent display unit 18, and the pixel electrode 16 and the common electrode 17 are provided on the reflective film 7 via the multi-gap layer. This allows a gap between the reflective film 7 and the comb-teeth electrodes (the pixel electrode 16 and the common electrode 17) in the reflective display unit 19 to become larger than that of Embodiment 1. Therefore, according to the present embodiment, it is possible to more surely avoid the effect that the reflective film 7 has on the field shielding effect and the like.

Thus, according to the present embodiment, it is possible to provide a semi-transparent display device, having a high degree of freedom for layout of a reflective region and having a higher quality of display, in which the reflective display unit 19 can be easily designed.

The present embodiment deals with a case where a reflective film 7 is provided on the transparent substrate 1 so as to be in the same layer as a gate electrode 2. The present embodiment, however, is not limited to this. An insulating film may be provided on the transparent substrate 1 separately from the gate insulating film 3, and then the reflective film 7 may be provided on the insulating film. Instead, a reflective film 7 is provided on a transparent substrate 1, an insulating film is provided on the transparent substrate 1 separately from the gate insulating film 3 so as to cover the reflective film 7 on the transparent substrate 1, and then a gate electrode 2 and a gate insulating film 3 are provided on the insulating film.

Embodiment 3

A further embodiment is described below with reference to FIG. 5 mainly. It should be noted that differences between Embodiments 1 and 2 and Embodiment 3 are described in the present embodiment, and that components having the same features as in Embodiments 1 and 2 are given the same reference numerals and their explanation is omitted.

Figure 5:
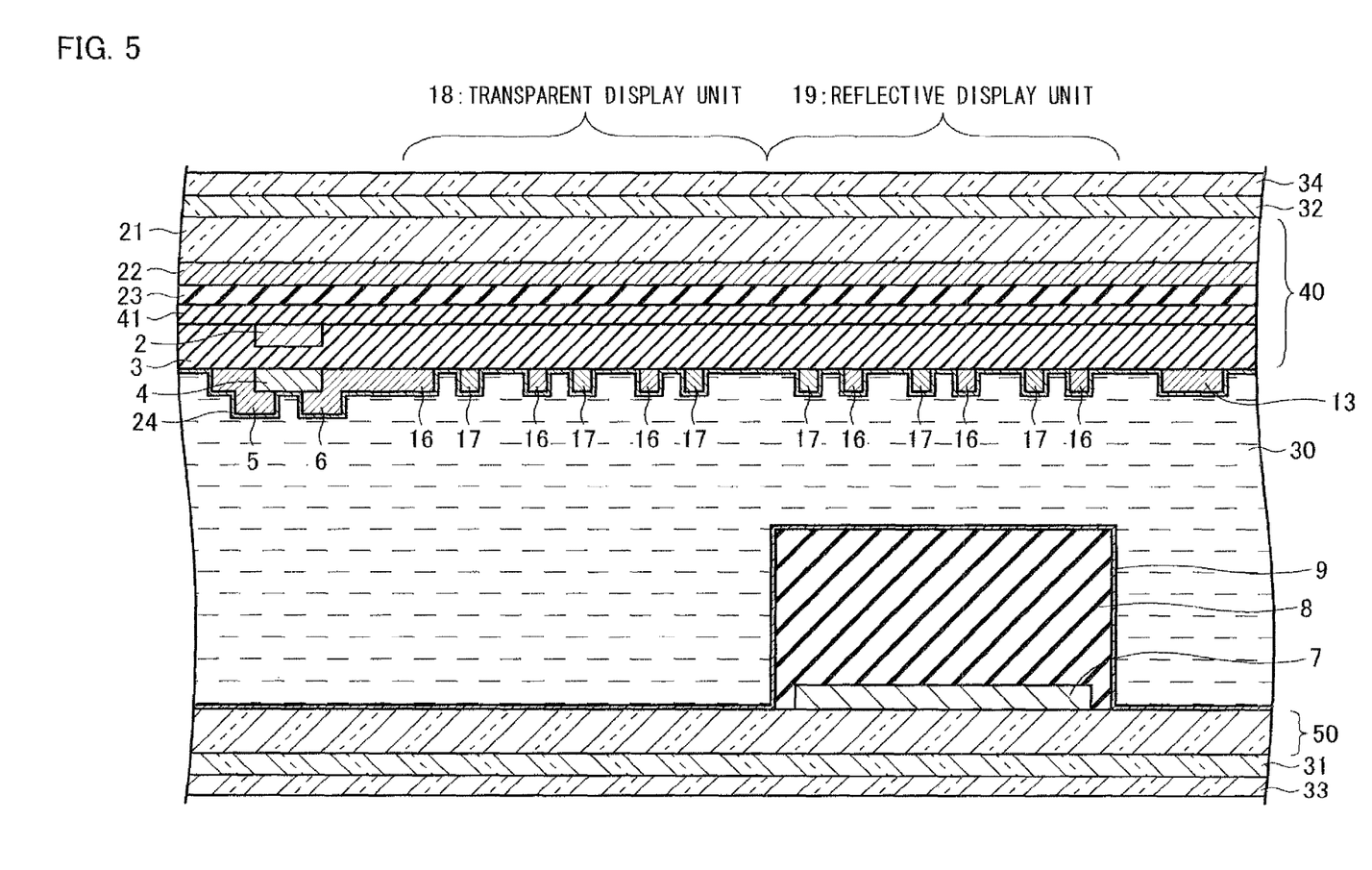
FIG. 5 is a cross-sectional view showing a structure of a pixel in a semi-transparent display device in accordance with Embodiment 3.

FIG. 5 is a cross-sectional view showing how a pixel is arranged in a semi-transparent display device of the present embodiment. Embodiment 2 deals with a semi-transparent liquid crystal display device as an example of a semi-transparent display device in accordance with the present embodiment. The arrangement of a cross-section of the semi-transparent display device shown in FIG. 5 schematically shows arrangements of respective cross-sections obtained by cutting the substrate in the same way as Embodiments 1 and 2.

In Embodiments 1 and 2, as shown in FIG. 1 and FIG. 4 respectively, a reflective film 7 is provided on the same substrate (a lower substrate 10) as comb-teeth electrodes (a pixel electrode 16 and a common electrode 17).

In contrast, in the present embodiment, a reflective film 7 is provided on a substrate (a lower substrate 50) that faces a substrate (an upper substrate 40) on which comb-teeth electrodes (a pixel electrode 16 and a common electrode 17) are provided.

Also in the semi-transparent liquid crystal display device (hereinafter referred to merely as liquid display device) of the present embodiment, as described in FIG. 5, a liquid crystal layer 30 (a medium layer) is sandwiched by a pair of substrates (the upper substrate 40 and the lower substrate 50) which are arranged to face each other. Retardation films 31 and 32 and polarizing plates 33 and 34 are provided outside the pair of substrates 40 and 50 (opposite side of the surfaces which face each other), respectively.

In the liquid crystal display device of the present embodiment, an active matrix substrate (a CF substrate) on which a color filter layer 22 is provided is used as the upper substrate 40.

Specifically, the upper substrate 40 is arranged so that (i) the color filter layer 22, an overcoat layer 23 (a planarizing layer), and an insulating layer 41 which serves as a first insulating layer are stacked, in this order, on a transparent substrate 21 such as glass, and (ii) a TFT 12 including a gate electrode 2, a gate insulating film 3, a semiconductor layer 4, a source electrode 5 and a drain electrode 6 is provided on the insulating layer 41. The present embodiment deals with a case where the gate electrode 2 in the TFT 12 is connected to a scanning signal line 14 (see FIG. 2), the source electrode 5 is connected to a data signal line 13, and the drain electrode 6 is connected to the pixel electrode 16 composed of the comb-teeth electrodes and having a comb-teeth shape. The common electrode 17 arranged to face and be parallel to the pixel electrode 16 so that their comb-teeth are alternately provided is connected to a common wiring 15 (see FIG. 2) running parallel to the scanning signal line 14. In addition, an alignment film 24 is provided on the pixel electrode 16 and the common electrode 17 so as to be in contact with the liquid crystal layer 30.

On the other hand, the lower substrate 50 includes the reflective film 7 provided on the surface which faces the upper substrate 40 in a transparent substrate 1 made of material such as glass so that the reflective film 7 faces part of the comb-teeth electrodes (the pixel electrode 16 and the common electrode 17) on the upper substrate 40. A multi-gap layer made up of an insulating layer 8 is provided on the reflective film 7. That is to say, the reflective film 7 is provided under the multi-gap layer also in the present embodiment. Additionally, an alignment film 9 is provided on the multi-gap layer.

In the transparent display unit 18 of the liquid crystal display device in accordance with the present embodiment, (i) the comb-teeth electrodes (the pixel electrode 16 and the common electrode 17) and (ii) the lower substrate 50 are arranged so as to face in a region (where the multi-gap layer does not exist) adjacent to the multi-gap layer, by which the liquid crystal layer 30 is sandwiched. An electric field generated between the pixel electrode 16 and common electrode 17 causes the liquid crystal layer 30 to be driven (a horizontal electric field drive is carried out).

Meanwhile, in the reflective display unit 19, the comb-teeth electrodes (the pixel electrode 16 and the common electrode 17) are arranged so as to face in a region in which the multi-gap layer is formed in the lower substrate 50, by which the liquid crystal layer 30 is sandwiched. An electric field generated between these pixel electrode 16 and common electrode 17 drives (horizontal electric field drive) the liquid crystal layer 30.

As described above, a liquid crystal display device of the present embodiment is arranged so that comb-teeth electrodes (a pixel electrode 16 and a common electrode 17) are provided on the upper substrate 40. This causes the comb-teeth electrodes to be provided closer to the display surface than the reflective film 7, via a multi-gap layer made up of an insulating layer 8, an alignment film 9, a liquid crystal layer 30, and an alignment film 24. This allows a gap between the reflective film 7 and the comb-teeth electrodes (the pixel electrode 16 and the common electrode 17) to be greater in the reflective display unit 19 than Embodiments 1 and 2. Therefore, according to the present embodiment, it is possible to more surely avoid the effect that the reflective film 7 has on the field shielding effect and the like.

Thus, according to the present embodiment, it is possible to provide a semi-transparent display device, having a high degree of freedom for layout of a reflective region and having a higher quality of display, in which the reflective display unit 19 can be easily designed.

The present embodiment deals with a case where a reflective film 7 is provided on the same plane as a multi-gap layer in a lower substrate 10 and is covered with the multi-gap layer. The present embodiment, however, is not limited to this. For example, it is also possible that an insulating film is provided on the transparent substrate 1 so as to cover the reflective film 7 and a multi-gap layer is provided on the insulating film so that the multi-gap layer and the reflective film 7 overlap each other. This causes the reflective film 7 to be provided lower than the multi-gap layer.

As described above, the display device is arranged so that a pixel includes (i) a transparent display section that carries out a transparent display in response to an electric field applied between comb-teeth electrodes and (ii) a reflective display unit having a reflective member provided separately from the comb-teeth electrodes, that carries out a reflective display in response to an electric field applied between ones of the comb-teeth electrodes, said ones of the comb-teeth electrodes and the reflective member overlapping each other. The reflective display section includes a multi-gap layer, having an insulative property, which is provided on the backside substrate and which projects toward the medium layer so that the medium layer has a thinner thickness in the reflective display section than in the transparent display section. Also, the comb-teeth electrodes are provided, via at least the multi-gap layer, so as to be closer to a display surface than the reflective member. The reflective member is provided in a lower layer than the multi-gap layer of the backside substrate so that the reflective member and the multi-gap layer overlap each other, or is provided on a same plane as the multi-gap layer so as to be covered with the multi-gap layer.

The liquid crystal display device in accordance with the present invention has a high degree of freedom for layout of a reflective region because the reflective region is not limited by the layout of the comb-teeth electrode, unlike a case where a comb-teeth electrode is used as a reflective electrode. Therefore, the reflective display unit 19 can be designed easily.

Additionally, with the arrangement, a gap between the comb-teeth electrodes and the reflective member becomes larger than a conventional device. As a result, field shielding effect generated by the reflective member is less likely to occur than a conventional semi-transparent liquid crystal display device in which a reflective member is provided under a pixel electrode.

Therefore, with the arrangement, it is possible to provide a semi-transparent display device capable of simple designing of the reflective display unit and preventing the reflective member from adversely affecting the comb-teeth electrode.

The comb-teeth electrodes in the reflective display unit can be provided on the multi-gap layer in the backside substrate, or on the display-side substrate. However, by means of the comb-teeth electrodes in the reflective display unit being provided on the display-side substrate, it becomes possible to enlarge a gap between the comb-teeth electrodes and the reflective member compared to a case where the comb-teeth electrode is provided on the multi-gap layer in the backside substrate.

On the other hand, when the comb-teeth electrodes are provided on the multi-gap layer in the backside substrate, any particular change in the design is not required, and it is easy to adjust positions of the comb-teeth electrodes and the reflective film.

The reflective member can be provided on a same plane as the comb-teeth electrodes provided on the backside substrate in the transparent display unit, or provided in a lower layer than the comb-teeth electrodes provided on the backside substrate in the transparent display unit. By means of the reflective member being provided in a lower layer than the comb-teeth electrodes on the backside substrate in the transparent display unit, it becomes possible to enlarge a gap between the comb-teeth electrodes and the reflective member.

The present invention is not limited to the embodiments described above, and variations can be effected within the scope of the following claims. Combinations of technical features described in different embodiments respectively are also included in the scope of the present invention.

INDUSTRIAL APPLICABILITY

A display device of the present invention has a higher quality of display than a conventional semi-transparent display device because it is easy to design a reflective display unit and it is possible to prevent a reflective member from adversely affecting a comb-teeth electrode. Therefore, the display device of the present invention is widely applicable to image display devices such as a TV and a monitor, office automation equipments such as a word processor and a personal computer, a video camera, a digital camera, and an image display device included in an information terminal or the like such as a cell phone.

The invention claimed is:

1. A display device comprising:
a pair of substrates, made up of a display-side substrate and a backside substrate, facing each other, that is on an opposite side of the display-side substrate, and a medium layer made up of a display medium which is sandwiched by the display-side substrate and the backside substrate, the display medium being driven and displayed by an electric field applied between comb-teeth electrodes provided on at least one of the pair of substrates,
a pixel including (i) a transparent display section that carries out a transparent display in response to an electric field applied between the comb-teeth electrodes and (ii) a reflective display section, having a reflective member provided separately from the comb-teeth electrodes, that carries out a reflective display in response to an electric field applied between ones of the comb-teeth electrodes, said ones of the comb-teeth electrodes and the reflective member overlapping each other,
the reflective display section including a multi-gap layer, having an insulative property, which is provided on the backside substrate and which projects toward the medium layer so that the medium layer has a thinner thickness in the reflective display section than in the transparent display section, and the comb-teeth electrodes being provided, via at least the multi-gap layer, so as to be closer to a display surface than is the reflective member, and
the reflective member being provided on a same plane as the multi-gap layer so as to be covered with the multi-gap layer, and being provided on a same plane as the comb-teeth electrodes provided on the backside substrate in the transparent display section.

2. The display device according to claim 1, wherein the comb-teeth electrodes in the reflective display section is provided on the multi-gap layer of the backside substrate.

* * * * *